Patented July 18, 1939

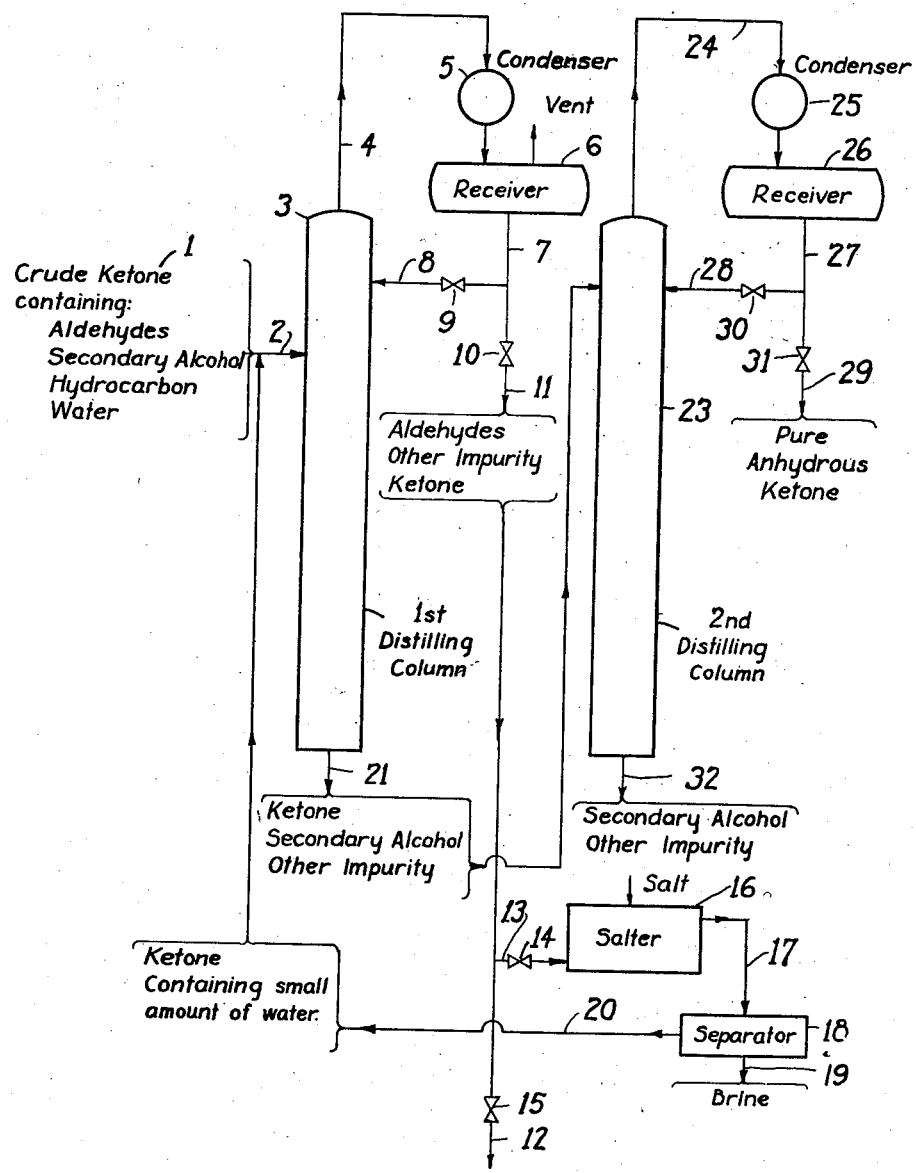

2,166,584

UNITED STATES PATENT OFFICE 2,166,584

PURIFICATION OF KETONES

Richard M. Deanesly, Berkeley, Calif., assignor to Shell Development Company, San Francisco, Calif., a corporation of Delaware Application November 25, 1935, Serial No. 51,467

6 Claims. (Cl. 202—39)

This invention relates to the manufacture of ketones from the corresponding secondary alcohols and deals particularly with a novel method for the purification of the crude ketones containing water and organic impurities, including aldehydic material and unconverted secondary alcohol, which are obtained as intermediate products in the process. The invention provides an improved distillation procedure, particularly adapted to continuous methods of operation, whereby pure ketones may be recovered from such crude intermediate products in good yields with minimum difficulty and expense while avoiding excessive heating which causes decomposition resulting in contamination of the final product.

My invention may be applied to the purification of any crude ketone mixture containing the impurities mentioned above irrespective of the method used for producing the ketone from the corresponding secondary alcohol. The crude ketones obtained as intermediate products of the controlled oxidation and/or dehydrogenation of secondary alcohols are particularly suitable for purification by my procedure. One suitable method for producing such crude ketones from the corresponding secondary alcohols is described, for example, in the United States Patent 1,952,702. The crude ketone which is the starting material for my novel purification process may be recovered from the other products of the reaction in any suitable manner. Resort may be had to extraction with suitable solvents, partial condensation, or other conventional procedures. In all the commercially available methods of producing ketones from secondary alcohols, side reactions occur to a greater or lesser extent and produce impurities which must be eliminated from the ketone if the latter is to find wide application in industry. The more usual undesirable decomposition reactions are dehydration of the alcohol to water and olefine, which may or may not be subsequently polymerized in whole or in part, and pyrolytic reactions leading to the formation of aldehydic material. Appreciable amounts of unconverted secondary alcohol will also be present. The proportions of these impurities present in the crude ketone is subject to considerable variation depending upon the method and conditions of ketone manufacture adopted. Where alcohol oxidation methods and/or ketone recovery by water extraction is employed, for example, the water content of the crude product may be quite high. In any case the crude ketones to which my invention is applicable will contain appreciable quantities of at least three different types of impurities, namely aldehydic material, water and unconverted secondary alcohol.

Ketones are normally regarded as very stable organic compounds which may be subjected to the usual methods of fractional distillation without change. I have found, however, that conventional distillation procedures are not suitable for industrial scale purification of crude ketones because the prolonged heating involved causes decomposition of constituents of the crude ketone which results in discoloration of the finished product in storage. Such color instability seriously curtails the salability of the final product and makes it unsuitable for the manufacture of light colored resins and for other uses where substantially water white ketones are required. It has furthermore been found that as the ratio of unconverted secondary alcohol to ketone in the crude ketone is increased the difficulties of separation are increased and larger fractionating columns and/or higher reflux ratios and consequently higher heat consumptions are required to effect separation of a pure product. Based upon these findings I have developed a commercially successful method of distillation whereby the impurities may be removed in combination rather than individually so that pure color stable ketones may be produced in a minimum number of operations.

For the purpose of making my invention more clear it will be described with more particular reference to the production of substantially pure acetone and methyl-ethyl ketone from crude intermediate products containing these ketones such as are obtained by the procedure of United States Patent 1,952,702 referred to above. But it will be understood that I am not to be limited to such applications of my invention since it is equally advantageous in the purification of other crude ketones such, for example as, crude methyl-isopropyl ketone, mesityl oxide, acetonyl acetone, cyclohexanone, aceto-phenone and higher homologues, analogues and substitution products. It will be further evident that similar procedures may be used with mixtures of ketones such as are obtained by the use of secondary alcohol mixtures as starting material.

In its application to the production of pure acetone my invention essentially comprises subjecting the crude acetone, preferably containing a higher proportion of acetone than of isopropyl alcohol, to distillation in two steps, most advantageously carried out in a continuous manner as the time of heating is thereby minimized. In the first distillation step substantially all the aldehyde and hydrocarbon impurity is removed as overhead product, while in the second the bottoms from the first fractionating column are distilled and substantially all the isopropyl alcohol and water separated as a second bottom product. By this procedure it has been found that the second step yields pure acetone as top product while the bottoms are free from acetone.

With a crude acetone of the following typical composition,

| | Per cent by weight |
|---|---|
| Aldehyde | 0.04 |
| Hydrocarbon impurity | 0.10 |
| Acetone | 37.95 |
| Isopropyl alcohol | 16.28 |
| Water | 45.63 | the first column should preferably be provided with about 30–40 (practical) plates and be operated with a reflux ratio of 5–10 to 1 at a still head temperature of about 56° C. Under these conditions the top product representing about 0.4% of the total acetone will have the following average composition:

| | Per cent by weight |
|---|---|
| Aldehyde | 2.4 |
| Hydrocarbon impurity | 6.0 |
| Acetone | 91.6 |

The feed to the second column will then be made up of about:

| | Per cent by weight |
|---|---|
| Acetone | 37.1 |
| Isopropyl alcohol | 16.6 |
| Water | 46.3 |

By operating the second column, having preferably about 50 plates, at a still head temperature 0.2° C. above that of the still head of the first column and a reflux ratio of 3 to 4 to 1 an acetone free bottom product of the following approximate composition is recovered and may be reprocessed in any convenient manner.

| | Per cent by weight |
|---|---|
| Isopropyl alcohol | 26.3 |
| Water | 73.6 |

The pure acetone obtained in this way will contain less than 0.1% usually less than 0.05%, isopropyl alcohol and will be substantially free from water and aldehydes. The acetone yield is about 99.6% and the product is color stable. The yield may be further increased by recovery of the acetone in the top product of the first fractionating column.

With crude starting material containing a ketone which forms a minimum boiling mixture with water, such for example as crude methyl ethyl ketone, higher proportions of the ketone appear in the top product of the first column. It is therefore advantageous to recover methyl ethyl ketone from the first distillate. Several different methods may be employed for this purpose such, for example, as extraction with suitable solvents, preferably such solvents as toluene or xylene which form no binary minimum boiling mixtures with methyl ethyl ketone or ternary minimum boiling mixtures with water and methyl ethyl ketone and are therefore easily separated from the extract by simple distillation, or by fractionation in the presence of a suitable third agent such as a saturated hydrocarbon or a gasoline cut, or the like. I have found it more advantageous to separate the methyl ethyl ketone content of the distillate from the first column by "salting". As salting out agents, sodium chloride, calcium chloride, potassium carbonate, sodium hydroxide or the like may be used. Since it is difficult to mix salt with the wet distillate because the salt becomes sticky and violent agitation is required to effect sufficient contact to produce equilibrium, I find it more suitable to combine the salting-out process with the rectification and preferably pass the condensed wet distillate from the first column, without cooling, upwards thru a column of brine maintained saturated by the presence of solid salt. It is advantageous to use a volume of salt solution which is large in comparison to the ketone being treated. The excess brine, as it is formed, may be drawn off from the salt treater, for example at the bottom, while the methyl ethyl ketone, usually containing about 3.9% water by weight, which separates may be returned to the first column for redistillation. In this way equilibrium is attained much more rapidly, the additional handling and storage of the distillate necessary if the two processes were carried out independently is eliminated and cooling and reheating the distillate is avoided.

As a typical example of such an application of my invention, a description will be given of the treatment of a crude methyl ethyl ketone of the following composition:

| | Per cent by weight |
|---|---|
| Aldehydes | 0.5 |
| Water | 1.0 |
| Secondary butyl alcohol | 22.4 |
| Hydrocarbon polymer | 1.5 |
| Methyl ethyl ketone | 74.6 |

Using a still head temperature of about 74° C. and a reflux ratio of about 20 to 1 in the first column, an overhead product of the following approximate composition may be obtained:

| | Per cent by weight |
|---|---|
| Aldehydes | 5.6 |
| Water | 8.8 |
| Methyl ethyl ketone | 85.6 |

After passage through a salt treater such as described above about 64% of the water content of this fraction, which represents about 10.5% of the ketone content of the original crude, may be eliminated and the fraction containing about 3% water returned to the first column for re-distillation.

When removing a top product such as the above from a crude of the composition given, the bottom product will be composed of about the following constituents:

| | Per cent by weight |
|---|---|
| Methyl ethyl ketone | 73.5 |
| Secondary butyl alcohol | 24.7 |
| Hydrocarbon polymer | 1.6 |
| Water | 0.2 |

When this product is fed to the second fractionating column maintained at a still head temperature of about 80° C. and a bottom temperature of not more than about 95° C. with a reflux ratio of about 5 to 1, a product containing at least 99% methyl ethyl ketone and not more than 0.3% water, the remainder being secondary butyl alcohol may be taken off. The yield is about 88.1% disregarding recoverable ketone in the side streams. The final bottom product in this case will have the following approximate composition:

| | Per cent by weight |
|---|---|
| Secondary butyl alcohol | 89.7 |
| Methyl ethyl ketone | 4.2 |
| Hydrocarbon polymer | 6.1 |

As the distillation is continued with return of methyl ethyl ketone from the salt treater to the first column the composition of the various fractions gradually changes, tending to reach an equilibrium in the first column representing a bottom product containing ketone equivalent to that in the crude feed. The presence of excessive amounts of aldehydes, however, may interfere with successful operation of the salt treater by increasing the water content of the distillate which is in equilibrium with the brine. It is usually advisable therefore to divert at least a part of the distillate from the first column at intervals to separate treatment for removal of accumulated aldehydes.

The methyl ethyl ketone recovered by this procedure has a color of about 0 to 5 by comparison with the platinum-cobalt standard. Furthermore this color is stable and does not increase substantially on prolonged storage in iron drums. This is to be contrasted with ketone recovered by conventional batch distillation of similar crude starting material for 15 to 20 hours which has an equally good color when freshly distilled but which rapidly darkens in storage in iron containers until a color of 15 or 25 or more is reached.

The flow of materials in accordance with this method of carrying out my invention is shown in the drawing where 1 represents a source of crude ketone which is fed via pipe 2 to a distilling column 3 in which substantially all the aldehydes and one other impurity is taken off overhead thru outlet 4 while bottoms comprising the bulk of the ketone, substantially all the secondary alcohol and the remaining impurity are withdrawn thru line 21. The overhead product is condensed in condenser 5 and collected in vented receiver 6. The condensate is withdrawn thru pipe line 7, a part returned as reflux thru line 8 by adjustment of valves 9 and 10. The remainder is removed by line 11 to either or both of lines 12 and 13 depending upon the settling of valves 14 and 15. Where ketones which do not form minimum boiling mixtures with water are being purified, e. g., where the impurities removed as overhead product from column 3 are aldehydes and hydrocarbon impurity, valve 14 may be closed and valve 15 opened so the total overhead is removed from the system. Where the ketone to be purified forms a minimum boiling mixture with water and the product from receiver 6 contains aldehydes, ketone and water, valve 15 may be closed and valve 14 opened allowing the mixture to flow thru salter 16. The product from salter 16 is taken off thru line 17 and stratified in separator 18. The lower brine layer is removed at 19 while the partially dehydrated ketone is taken off at 20 and returned to distilling column 3 as part of the feed thru line 2. Alternatively both valves 14 and 15 may be opened continuously or intermittently to permit diversion of a part of the distillate for removal of accumulated aldehydes while the remainder is salted out in the salter. Whatever the disposition of the aldehyde containing overhead product, the bottom product withdrawn thru line 21, is fed to a distillation column such as 23 in which substantially pure, anhydrous ketone is removed as overhead product thru line 24, condensed in 25 and collected in receiver 26. A part of the condensate taken off thru line 27 is returned to the column as reflux thru line 28 while the remainder is removed as product thru line 29, the reflux ratio being controlled by adjustment of valves 30 and 31. The impurities, i. e. secondary alcohol and water in the case of ketones which form no minimum boiling mixtures with water and secondary alcohol and hydrocarbon in the case of ketones which do form such mixtures, are removed as bottoms thru line 32.

It is thus evident that my process offers many advantages in the technical scale production of pure ketones from the corresponding secondary alcohols. By the preferred procedure of carrying out the alcohol conversion under conditions which produce crude ketones containing high ratios of ketone to unconverted secondary alcohol, material savings in heat consumption in the separation of these two constituents may be effected due to the lower reflux ratios required in distillation. By reducing the time of heating of the ketone, which is most conveniently accomplished by continuous distillation in two separate fractionating columns but may also be effected by suitable rapid batch or intermittent distillations, the color stability of the product is greatly improved. By eliminating more than one impurity in each distillation step the required distillation equipment is reduced and control of the purification is simplified.

My process has the further advantage of producing side streams containing secondary alcohol which may be returned to the converter to increase the over-all yield of ketone. Thus, for example, by return of the final bottom product of methyl ethyl ketone purification, above described, not only is the yield of ketone increased by conversion of the alcohol content but also there is no accumulation of hydrocarbon polymer in the system but an equilibrium is reached after which the polymer content of the bottom product remains substantially constant.

While I have in the foregoing described in some detail the preferred embodiment of my invention and some variants thereof, it will be understood that this is only for the purpose of making the invention more clear and that the invention is not to be regarded as limited to the details of operation described nor is it dependent upon the soundness or accuracy of the theories advanced as to the advantageous results attained. On the other hand, the invention is to be regarded as limited only by the terms of the accompanying claims, in which it is my intention to claim all novelty inherent therein as broadly as is possible in view of the prior art.

I claim as my invention:

1. A process of purifying a crude ketone containing hydrocarbon, aldehyde, water and secondary alcohol obtained in the manufacture of ketone from the corresponding secondary alcohol which comprises distilling said crude ketone to remove therefrom a top product comprising substantially all the aldehyde content together with substantially all of another impurity present in said crude ketone and not more than a minor part of said ketone, and then distilling the bottom product thereby obtained to recover therefrom ketone in a substantially pure form as overhead product and to leave as a second bottom product substantially all the secondary alcohol and other remaining impurity the operations being effected in two distillations.

2. In a process of producing acetone from isopropyl alcohol the steps of distilling from a crude acetone containing aldehyde, hydrocarbon impurity, isopropyl alcohol and water, a top product comprising substantially all the aldehyde and hydrocarbon impurity and not more than a minor part of the acetone and then distilling the bottom product thereby obtained to recover therefrom acetone in a substantially pure form as overhead product and to leave as a second bottom product substantially all the isopropyl alcohol and water substantially free from acetone the operations being effected in two distillations without the addition of extraneous agents during distillation.

3. A continuous process of producing substantially pure acetone from crude acetone containing aldehyde, hydrocarbon impurity, isopropyl alcohol and water, which comprises continuously feeding said crude acetone to a fractionating column maintained at a still head temperature of about 55 to 56° C., removing an overhead product comprising substantially all the aldehyde and hydrocarbon impurity content of the crude acetone, continuously withdrawing the bottom product of said column and feeding it to a second fractionating column in which a higher still head temperature and lower reflux ratio are maintained than in the first said column and in which substantially all the acetone content is separated in a substantially pure form as top product and substantially all the isopropyl alcohol and water content of the crude acetone is continuously withdrawn as bottom product.

4. A process of producing substantially pure methyl ethyl ketone from a crude methyl ethyl ketone comprising aldehydic material, hydrocarbon impurities, secondary butyl alcohol and water which comprises distilling from said crude ketone a top product comprising substantially all the aldehydic and water content thereof and then distilling the bottom product thereby obtained at a higher still head temperature and lower reflux ratio than those used in the first distillation to recover therefrom the bulk of the methyl ethyl ketone content of the crude ketone in a substantially pure form as overhead product and to leave a second bottom product comprising substantially all the secondary butyl alcohol and hydrocarbon impurities the operations being effected in two distillations.

5. In a process of producing substantially pure methyl ethyl ketone from crude methyl ethyl ketone containing aldehydic material, hydrocarbon impurities, secondary butyl alcohol and water, the steps of distilling from said crude ketone a top product comprising substantially all the aldehydic and water content of said crude ketone, substantially reducing the water content of said top product then returning it to said first distillation and distilling the bottom product of said first distillation at a higher still head temperature and lower reflux ratio than those used in the first distillation to remove therefrom substantially pure methyl ethyl ketone as overhead product.

6. A continuous process of purifying crude methyl ethyl ketone containing aldehydic material, hydrocarbon polymer impurities, secondary butyl alcohol and water which comprises continuously feeding said crude ketone to a fractionating column maintained at temperature conditions at which substantially all the aldehydic material and water present in said crude ketone are removed as overhead product, continuously contacting the condensed overhead product with a saturated salt solution in the presence of solid salt and returning the resulting product of lower water content to said fractionating column, continuously withdrawing the bottom product of said column to a second fractionating column maintained at a still head temperature of about 80° C. and continuously recovering therefrom substantially pure methyl ethyl ketone as top product and substantially all the secondary butyl alcohol and hydrocarbon polymer content of the crude ketone as bottom product.

RICHARD M. DEANESLY.